United States Patent [19]
Saito et al.

[11] Patent Number: 5,500,710
[45] Date of Patent: Mar. 19, 1996

[54] SOURCE VOLTAGE MONITOR FOR A PHOTOGRAPHIC CAMERA

[75] Inventors: Tatsuo Saito; Haruo Onozuka, both of Ohmiya, Japan

[73] Assignee: Fuji Photo Optical Co., Ltd., Ohmiya, Japan

[21] Appl. No.: 357,091

[22] Filed: Dec. 15, 1994

Related U.S. Application Data

[63] Continuation of Ser. No. 81,526, Jun. 23, 1993, abandoned.

[30] Foreign Application Priority Data

Jun. 25, 1992 [JP] Japan .................................. 4-191669

[51] Int. Cl.$^6$ ............................. G03B 7/26; G03B 15/02
[52] U.S. Cl. ............................ 354/484; 354/127.12
[58] Field of Search ........................ 354/484, 127.1, 354/418, 468, 473, 464, 127.12

[56] References Cited

U.S. PATENT DOCUMENTS

| | | | |
|---|---|---|---|
| 4,126,874 | 11/1978 | Suzuki et al. | 354/484 |
| 4,269,494 | 5/1981 | Shiozawa et al. | 354/484 |
| 4,389,111 | 6/1983 | Uchidoi et al. | 354/173 |
| 4,458,996 | 7/1984 | Harigaya et al. | 354/412 |
| 4,502,774 | 5/1985 | Suzuki et al. | 354/403 |
| 4,611,898 | 9/1986 | Matsuyama | 354/484 |
| 4,792,762 | 12/1988 | Shiina et al. | 324/426 |
| 4,799,078 | 1/1989 | Hayama | 354/412 |
| 5,027,150 | 6/1991 | Inoue et al. | 354/484 |
| 5,053,804 | 10/1991 | Odaka et al. | 354/484 |
| 5,113,210 | 5/1992 | Kashiyama et al. | 354/400 |

OTHER PUBLICATIONS

U.S. Application S.N. 08/071,706, filed Jun. 4, 1993, entitled Film Transporting System For Photographic Camera.
U.S. Application S.N. 08/071,703, filed Jun. 4, 1993, entitled Input System For Photographic Camera.
U.S. Application S.N. 08/073,171, filed Jun. 8, 1993, entitled Film Transporting System For Photographic Camera.

*Primary Examiner*—Michael L. Gellner
*Assistant Examiner*—Nicholas J. Tuccillo
*Attorney, Agent, or Firm*—Price, Heneveld, Cooper, DeWitt & Litton

[57] ABSTRACT

A source voltage monitor for a photographic camera is adapted to determine, prior to release, whether the source voltage is at a level sufficiently high for effective release for exposure. The monitor uses a predetermined reference voltage for the comparison, which voltage is selected independently of the selected mode of photographing. According to the invention, the source voltage is checked prior to release with a lens barrel driving circuit and/or a shutter blade driving circuit energized, depending on the selected mode of photographing. In the preflash mode, for example, both the lens barrel driving circuit and the shutter blade driving circuit are energized during the source voltage check. In low luminance automatic strobe discharge mode, only the lens barrel driving circuit is energized during the source voltage check.

18 Claims, 2 Drawing Sheets

| PHOTOGRAPHING MODES | MD1 MD2 | IM1 IM2 |
|---|---|---|
| AUTO | ON | OFF |
| PRE | ON | ON |
| ON | ON | OFF |

000
SOURCE VOLTAGE MONITOR FOR A PHOTOGRAPHIC CAMERA

This is a continuation of application Ser. No. 08/081,526 filed on Jun. 23, 1993, now abandoned.

BACKGROUND OF THE INVENTION

1. Technical Field

This invention relates to a source voltage monitor for a photographic camera having a built-in battery commonly used to energize various components such as a film transporting motor, a lens barrel driving motor, a shutter blade driving motor and a strobe. The device is adapted to determine whether a source voltage is at a level sufficiently high to assure effective operation of release for exposure and to disable the release if the source voltage is determined to be insufficient.

2. Prior Art

Handy photographic cameras, arranged such that users having neither special skill nor special experience in photography may easily and reliably take a photograph, have become very popular. Such cameras are usually provided with various components, such as an automatic film transporter, an automatic variable focus feature, and a strobe. The automatic film transporter is operatively associated with a rear cover of the camera body and a built-in motor so that, upon closure of the rear cover after a film cartridge has been loaded into the camera, the motor is actuated to advance the film roll thus loaded until the first frame reaches a position ready for exposure when a first photograph is taken. Upon release, the motor is actuated again to advance the film roll by one frame so as to bring the next frame into alignment with the aperture and, as soon as all the frames have been exposed, the film roll is rewound into the cartridge. The automatic variable focus feature is generally classified as either a two focus change-over type, adapted to change-over the focal distance between normal and telephoto focal distances, and a continuous focus changing type, adapted to change the focal distance in a continuous fashion. Both the change-over type and the continuous changing type automatic focuses are achieved by axially moving the lens barrel, which holds the objective therein, selectively forward or backward through actuation of the lens barrel driving motor.

The strobe is automatically discharged, when it is determined on the basis of object luminance data derived from an automatic exposure meter that a current luminance on the object to be photographed is insufficient for effective photographing.

A color picture of a subject's face taken using the strobe flash light is sometimes disadvantageously accompanied with so-called red eye phenomenon, in which pupils of the subject's eyes are reproduced in red. To avoid this red eye phenomenon, some photographic cameras are equipped to preflash discharge a flash lamp to light up the face before the strobe is discharged. More specifically, pupils of the eyes close responsive to this preliminary flash, and then the picture is taken as the strobe is discharged.

In taking a photograph using a camera equipped with a strobe having such a preflash function, the user can select any one of three modes for the strobe, i.e., preflash mode in which a preflash discharge occurs prior to strobe discharge, low luminance automatic strobe discharge mode in which the strobe is automatically discharged in response to a signal representing a luminance on the object lower than a predetermined level, and a forcible strobe discharge mode in which the strobe is forcibly discharged, regardless of the luminance level.

To reduce the weight and size of the camera, a common built-in battery is utilized as a power source serving to energize the previously mentioned various components, such as the film transporting motor, the lens barrel driving motor, the shutter blade driving motor and the strobe.

Since these popular cameras equipped with the above-mentioned various components must be easy to use and reliable even when the person taking the photograph has little knowledge and experience in photography, every release for exposure must be done with an appropriate, automatically adjusted lens opening and shutter speed. Since the shutter blades are opened and closed by the associated motor, it is important to disable operation of the release when the source voltage is determined to be insufficient to actuate the shutter blade driving motor. To this end, the camera of this type is equipped with a source voltage monitor adapted to determine, prior to operation of release for exposure, whether the source voltage is at a level sufficiently high for effective release.

The acceptable lower limit of the source voltage for effective release for exposure depends upon the mode of photographing. Specifically, in the low luminance automatic discharge mode, the lower limit corresponds to the minimum voltage ($V_0$) necessary to actuate the shutter blade driving motor if the automatic exposure meter indicates that an object to be photographed has a luminance sufficient for effective exposure, since the strobe is not discharged. If the luminance is low and thus the strobe must be discharged, the lower limit of the voltage demand will correspond to the minimum voltage ($V_1$) necessary to actuate the shutter blade driving motor and to discharge the strobe. Also in the forcible strobe discharge mode, the lower limit of the voltage demand corresponds to the minimum voltage ($V_1$) necessary to actuate the shutter blade driving motor and to discharge the strobe. In the preflash mode, the lower limit of voltage demand is equal to the minimum voltage ($V_2$) necessary to discharge the flash lamp, the strobe, and the shutter blade driving motor.

With the source voltage monitor of the prior art, the reference voltage used for comparison depends on the mode of photographing. More specifically, the voltage $V_1$ is used as the reference voltage in the low luminance automatic strobe discharge mode, as well as in the forcible strobe discharge mode, and the voltage $V_2$ is used as the reference voltage in the preflash mode in order to evaluate the source voltage.

However, such source voltage monitor of the prior art, disadvantageously requires relatively complicated monitor processing, since the reference voltage must be set for each mode of photographing and the processing procedure must be changed depending on the mode of photographing.

In addition, separate circuits must be provided to obtain the respective reference voltages, so the circuit arrangement is also complicated and the number of parts correspondingly increases.

SUMMARY OF THE INVENTION

Accordingly, it is a principal object of the invention to provide a source voltage monitor for a photographic camera so improved over the prior art that the operation of the monitor can be achieved on the basis of a constant reference voltage predetermined independently of the photographing mode without complicating both the processing procedure and the circuit arrangement.

To achieve the object set forth above, the invention generally resides in a source voltage monitor for a photographing camera. The camera components include at least a film transporting motor, a lens barrel driving motor used to move the lens barrel which holds the objective therein selectively forward or backward thereby to change a focal distance of the objective, a shutter blade driving motor used to open and close shutter blades for every exposure, a built-in strobe, and a common power source. The common power source is used to energize all of these components contained in the camera. A source voltage monitor is adapted to determine, prior to exposure, whether the source voltage is at a level sufficiently high for a selected mode of photographing. The source voltage is checked by the voltage monitor with one or more of the previously mentioned components energized by the common power source, depending on the selected mode of photographing.

The mode of photographing is selected from low luminance automatic strobe discharge mode, preflash mode, forcible strobe discharge mode and forcible strobe disable mode.

The source voltage level is checked by the source voltage monitor relative to a constant reference voltage predetermined independently of the selected mode of photographing.

The components to be energized during source voltage comprise one or more of the above-mentioned motors operatively associated with film transport, lens barrel, shutter blades and the strobe, selected depending on the selected mode of photographing.

The source voltage check is performed with a lens barrel driving circuit being energized in the low luminance automatic strobe discharge mode, with a lens barrel driving circuit, as well as a shutter blade driving circuit being energized in the preflash mode, with the lens barrel driving circuit energized in the forcible strobe discharge mode, and with the shutter blade driving circuit being energized in the forcible strobe disable mode.

In order to assure that a failure of photographing due to insufficient source voltage can be avoided by disabling the shutter release, the invention is embodied in a photographic camera equipped with a source voltage monitor. The camera includes at least a film transporting motor, a lens barrel driving motor used to move the lens barrel, which holds the objective therein, selectively forward or backward to change a focal distance of the objective, a shutter blade driving motor used to open and close shutter blades for every exposure, a built-in strobe, and a common power source. The source voltage check is adapted to determine, prior to exposure, whether the source voltage is at a level sufficiently high for a selected mode of photographing. The source voltage check is performed by the source voltage monitor with various ones of the components energized, wherein the components energized during the check depends upon the selected mode of photographing. A shutter control process for disabling a release is run when the source voltage has been determined to be higher than a reference voltage and a process of release disabling is run when the source voltage has been detected to be lower than the reference voltage.

It is now assumed that mode of photographing is selected from three modes, i.e., preflash mode, low luminance automatic strobe discharge mode and forcible strobe discharge mode, and operation of the source voltage monitor is performed prior to release for each mode of photographing. The lens barrel driving circuit serving to actuate the lens barrel driving motor and the shutter blade driving circuit serving to actuate the shutter blade driving motor are energized in the preflash mode. The lens barrel driving circuit is energized in the forcible strobe discharge mode or the low luminance automatic strobe discharge mode. The shutter blade driving circuit is energized in the forcible strobe disable mode. Thus, the source voltage is checked while the component, or components, of the camera, appropriate for a particular mode of photographing, are energized.

BRIEF DESCRIPTION OF THE DRAWINGS

The invention will be described by way of example in reference with the accompanying drawings, in which.

DETAILED DESCRIPTION OF THE PREFERRED EMBODIMENTS

It should be understood that the source voltage monitor of the invention will be described with respect to a specific embodiment in which the lens barrel driver and the shutter blade driver are energized during operation of source voltage monitor.

Figures 1, 2:
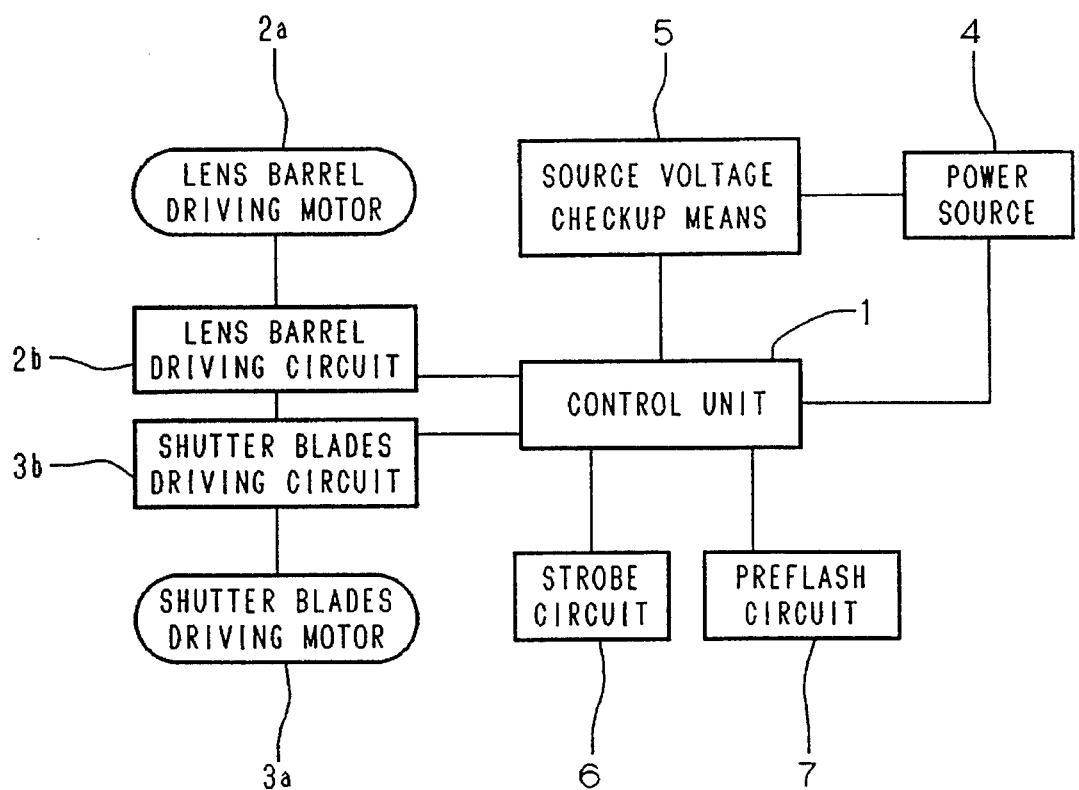
FIG. 1 is a circuit schematic in block diagram form showing the arrangement of the source voltage monitor.
FIG. 2 is a comparison table showing the relationship between the mode of photographing and the load to be energized during the source voltage check.

Referring to FIG. 1, the monitor device substantially comprises a control unit 1 which contains, in turn, a central processing unit (CPU). The objective (not shown) is moved by a lens barrel driving motor 2a along the optical axis to change a focal distance thereof. The lens barrel driving motor 2a has rotating direction, starting, and stopping, controlled by a lens barrel driving circuit 2b which is applied from control unit 1 with a motor drive signal.

The shutter blades for exposing film are opened and closed by a shutter blade motor 3a. Factors such as the size of the shutter opening and the shutter speed are controlled by a shutter blade driving circuit 3b. Information relevant to the shutter release is communicated between the shutter blade driving circuit 3b and control unit 1.

A built-in battery serving as a power source 4 is electrically connected to control unit 1 to which, in turn, source voltage monitor 5 is electrically connected. Source voltage monitor 5 is electrically connected to power source 4.

The camera has a built-in strobe (not shown) which is discharged or not discharged depending on the object luminance determined by an exposure controller (not shown). In the illustrated embodiment, the strobe is automatically discharged in response to the object luminance being so low that adequate exposure cannot be obtained under natural light alone. A strobe circuit 6 is electrically connected to control unit 1 and applied therefrom with a strobe discharge signal. It should be understood that the operation of the strobe is not limited to the manner in which the strobe is automatically discharged in response to the object luminance being lower than a threshold level, but can be adapted to be forcibly discharged by suitable means, such as a switch button, whether or not the object luminance under the natural light is sufficient, and in a telephoto mode. For example, the strobe can be adapted to be disabled, i.e., operate in the forcibly strobe disabled mode, regardless of the object luminance under the natural light.

A preflash circuit 7 is electrically connected to control unit. When the preflash mode is selected, a flash lamp is discharged before the strobe is discharged in order to light up the object, and thereby avoid the "red eye" phenomenon. Selection of the preflash mode is made by operating an appropriate switch, or the like.

Source voltage monitor 5 determines, prior to exposure, whether the voltage of source 4 is at a predetermined value (reference voltage). The reference voltage is a predetermined constant. The reference voltage is not varied dependent upon the selected mode of photographing. A source voltage check is performed with the appropriate camera components energized, the components energized are the ones which must be energized during a selected mode of photographing. For example, the lens barrel driving circuit 2b and the shutter blade driving circuit 3b, are energized in a selected mode of photographing.

FIG. 2 is a comparison table showing a relationship between the mode of photographing and the means to be energized during the source voltage check. As will be apparent from this table, the lens barrel driving motor (MD1, MD2) 2a is ON and the shutter blade driving motor (IM1, IM2) 3a is OFF in the low luminance automatic strobe discharge mode (AUTO). Both the lens barrel driving motor 2a and the shutter blade driving motor 3a are ON in the preflash mode (PRE). Lens barrel driving motor 2a is ON and shutter blade driving motor 3a is OFF in the forcible strobe discharge mode (ON).

Figure 3:
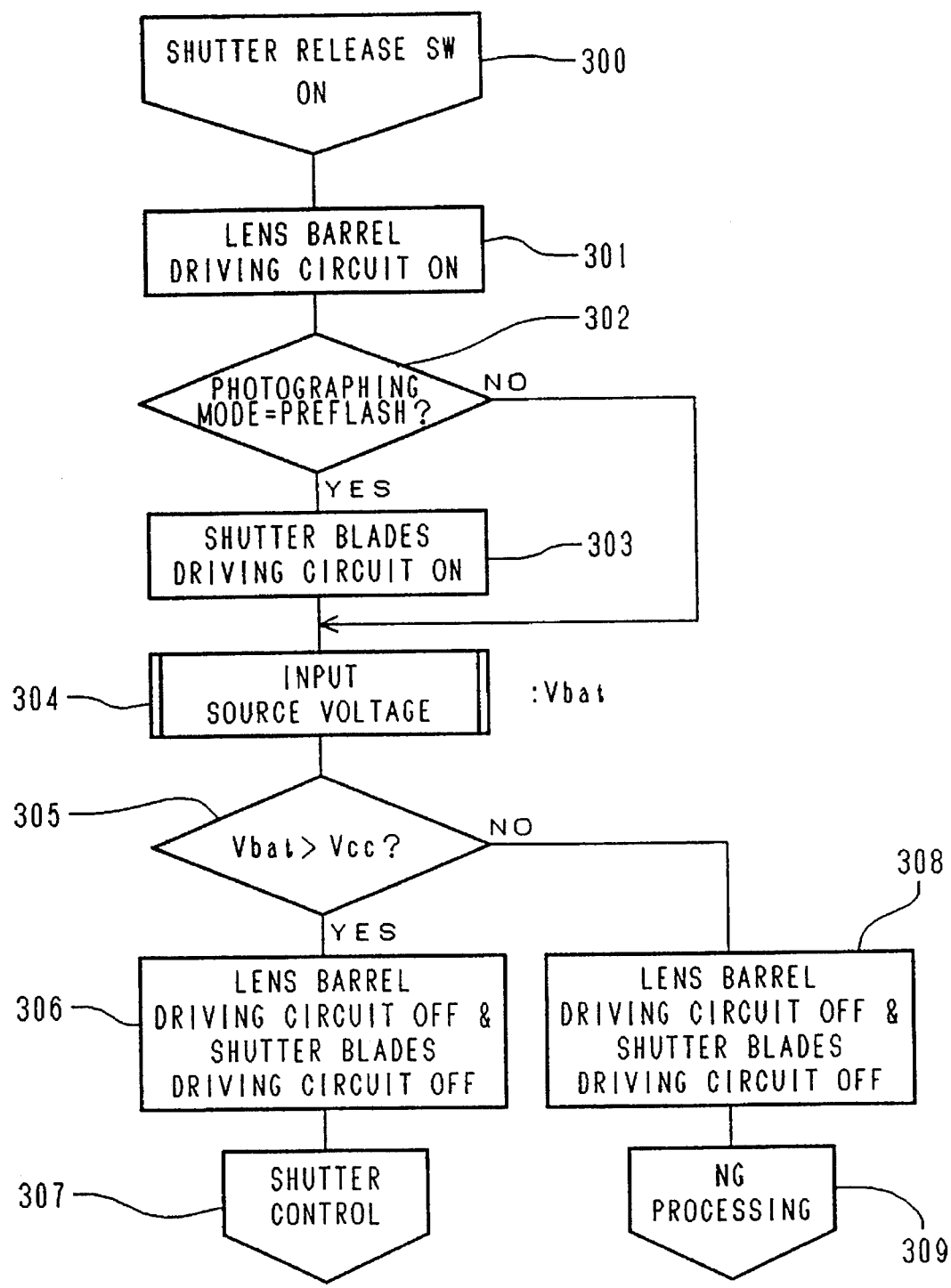
FIG. 3 is a flow chart illustrating a procedure for checking the source voltage.

The procedure of source voltage checking by the source voltage monitor constructed as has been mentioned above, will be described with reference to the flow chart of FIG. 3.

When a shutter release switch is turned ON for photographing, the routine proceeds to step 300 to run the voltage check processing. The shutter release switch comprises a two-stage switch so that, upon depression of the switch to the first stage, the distance to an object to be photographed is determined by a range finder circuit (not shown), then a luminance on this object is determined by a photometric circuit (not shown), and the source voltage check is run. The routine proceeds to step 301 to turn the lens barrel driving circuit 2b ON. Then, the routine proceeds to step 302 to determine whether the mode of photographing is the preflash mode or not.

If the conclusion of step 302 is YES, the routine proceeds from step 302 to step 303 to turn the shutter blade driving circuit 3b ON and proceeds to step 304. If the conclusion of step 302 is NO, the routine proceeds from step 302 directly to step 304. In step 304, input of the source voltage (Vbat) is run. The routine proceeds to step 305 to compare this source voltage with the reference voltage (Vcc).

Specifically, if the preflash mode has been selected, the voltage (Vbat) of source 4 is compared with the reference voltage (Vcc) with the lens barrel driving circuit 2b and the shutter blade driving circuit 3b being ON. If a mode of photographing other than the preflash mode has been selected, the comparison is made with lens barrel driving circuit 2b ON. Accordingly, the reference voltage (Vcc) is constant independently of the selected mode of photographing and this reference voltage (Vcc) corresponds to the minimum voltage necessary to drive the shutter blades.

If step 305 determines that the source voltage (Vbat) is higher than the reference voltage (Vcc), the routine proceeds to step 306 and, if the source voltage (Vbat) is lower than the reference voltage (Vcc), the routine proceeds to step 308.

In step 306, the lens barrel driving circuit 2b and the shutter blade driving circuit 3b are turned OFF, and the routine proceeds to step 307 to run the shutter control. During shutter control, the shutter release switch is depressed to the second half stage to achieve a desired exposure. In this exposure, if the selected mode is the low luminance automatic discharge mode, the strobe is not discharged if the luminance of the object being photographed is sufficiently high and the strobe is discharged if the luminance of the object is lower than a predetermined level. If the selected mode is the preflash mode, the flash lamp is discharged for an appropriate period to close pupils of a figure to be photographed, and thereafter the strobe is discharged.

If in step 305, the source voltage (Vbat) has been determined to be lower than the reference voltage (Vcc), the routine proceeds to step 308 to turn the lens barrel driving circuit 2b and the shutter blade driving circuit 3b OFF, and then the routine proceeds to step 309 to run a processing of release disabling (NG processing). Namely, based on a determination that the source voltage is insufficient to obtain an effective exposure, the release is disabled. After the shutter release switch has been turned OFF, necessary processing, such as recharging of the strobe, is made to prepare for turning ON the shutter release switch.

While the invention has been described hereinabove with reference to the specific embodiment in which three modes of photographing are available, i.e., low luminance automatic strobe discharge mode, preflash mode and forcible strobe discharge mode, the source voltage monitor can skip over step 301 if no strobe discharge is needed, as in the telephoto mode, since it will not be necessary to turn the lens barrel driving circuit 2b ON.

Effect of the Invention

As will be readily appreciated from the foregoing description, the source voltage monitor according to the invention is so arranged that the components energized during the source voltage check may be changed depending on the selected mode of photographing, to change the load current and therefore a resulting voltage drop. Consequently, using a constant reference voltage, predetermined independently of the selected mode of photographing, the same effect is obtained, as has been obtained in the prior art, wherein the reference voltage is changed depending on the selected mode of photographing.

Accordingly, it is unnecessary to set separate reference voltages depending on the respective modes of photographing and thereby the monitor process can be correspondingly simplified. It is also unnecessary to provide separate circuits adapted to increase or decrease the load current, so the circuit arrangement can be simplified, and the number of parts can be reduced.

Existing circuits such as the lens barrel driving circuit and the shutter blade driving circuit can be utilized to adjust the load current without using additional parts, and therefore existing cameras can be easily modified to include the source voltage monitor.

The embodiments of the invention in which an exclusive property or privilege is claimed are defined as follows:

1. A camera, comprising:

a film transporting circuit having a film transporting motor;

a lens barrel driving circuit having a lens barrel driving motor used to move the lens barrel, which holds an objective therein, selectively forward or backward to change a focal distance of the objective;

a shutter blade driving circuit having a shutter blade driving motor used to open and close shutter blades for every exposure;

a built-in strobe circuit;

a common power source;

a photographing mode selector for selecting one of a plurality of different photographing modes, the selected photographing mode requiring a particular power source voltage level during exposure;

a controller coupled to said mode selector and to said circuits for selectively enabling one or more particular ones of said circuits according to the mode of photographing selected by said selector in order to apply a load to the power source that will result in a power draw that is related to the selected photographing mode; and a monitor coupled to said common power source, said monitor determining, prior to exposure, whether the source voltage is at a level sufficiently high for a selected mode of photographing, wherein said determination is performed by said monitor with said controller enabling said one or more particular ones of said circuits according to the selected mode of photographing, whereby the power drawn from said common power source is varied during testing according to the mode of photographing selected and wherein said monitor circuit determines whether the source voltage level is greater than a fixed reference voltage predetermined independently of the selected mode of photographing to check said source voltage.

2. The photographic camera as defined in claim 1, wherein said monitor circuit samples an output of said voltage source to generate a sampled voltage, and compares said sampled voltage to said fixed reference voltage which is predetermined independently of the selected mode of photographing to check said source voltage.

3. The photographic camera as defined in claim 1, wherein the mode of photographing is selected from a low luminance automatic strobe discharge mode, a preflash mode and a forcible strobe discharge mode.

4. The photographic camera as defined in claim 2, wherein said determination is performed with the lens barrel driving circuit energized and the shutter blade driving circuit disabled in the low luminance automatic strobe discharge mode.

5. The source voltage monitor for a photographic camera as defined in claim 3, wherein said determination is performed with the lens barrel driving circuit and the shutter blade driving circuit energized in the preflash mode.

6. The photographic camera as defined in claim 2, wherein said determination is performed with the lens barrel driving circuit energized and the shutter blade driving circuit disabled in the forcible strobe discharge mode.

7. The photographic camera as defined in claim 3, wherein said monitor circuit samples an output of said voltage source to generate a sampled voltage and compares the sampled voltage to said fixed reference voltage which is predetermined independently of the selected mode of photographing to check said source voltage.

8. The photographic camera as defined in claim 1, wherein the mode of photographing is selected from a low luminance automatic strobe discharge mode, a preflash mode, a forcible strobe discharge mode and a forcible strobe disable mode.

9. The photographic camera as defined in claim 8, wherein said determination is performed with the shutter blade driving circuit energized and the shutter blade driving circuit disabled in the forcible strobe disable mode.

10. The photographic camera as defined in claim 8, wherein said determination is made with the lens barrel driving circuit being energized and the shutter blade driving circuit disabled in the low luminance automatic strobe discharge mode.

11. The photographic camera as defined in claim 3, wherein said determination is made with said lens barrel driving circuit and the shutter blade driving circuit energized in the preflash mode.

12. The photographic camera as defined in claim 8, wherein the determination is made with the lens barrel driving circuit being energized and the shutter driving circuit disabled in the forcible strobe discharge mode.

13. The photographic camera as defined in claim 8, wherein said monitor circuit samples an output of said voltage source to generate a sampled voltage and compares the sampled voltage to the fixed voltage which is predetermined independently of the selected mode of photographing.

14. A photographic camera comprising:

a film transporting circuit having a film transporting motor;

a lens barrel driving circuit including a lens barrel driving motor used to move the lens barrel which holds the objective therein selectively forward or backward to change a focal distance of the objective;

a shutter blade driving circuit including a shutter blade driving motor used to open and close shutter blades for every exposure;

a built-in circuit strobe;

a common power source coupled to said circuits and providing energizing power to said circuits;

a mode selector for selecting one of a plurality of different operating modes of photographing, the selected mode of photographing requiring a particular power source voltage level during exposure;

a controller selectively energizing said circuits;

a fixed reference signal generator outputting a fixed reference signal; and a source voltage monitor including a monitor circuit coupled to said fixed reference generator and said voltage generator, said monitor determining prior to exposure, whether said source voltage is at a level greater than said fixed reference signal such that it has a sufficient power to energize said shutter blade driving motor for the selected mode of photographing;

wherein said controller selectively enables one or more of said circuits depending on the mode selected concurrently with said source voltage monitor determining whether the source voltage is at a level greater than the fixed reference signal, wherein the power drawn from said power source is varied as a function of the selected mode of photographing, and wherein a process of shutter control is run resulting in exposure when the source voltage has been determined to be higher than said fixed reference level signal and a process of release disabling is run inhibiting exposure when the source voltage is detected to be lower than said fixed reference level signal.

15. A photographic camera comprising:

a lens barrel driving circuit including a lens barrel driving motor used to move the lens barrel holding an objective therein forward and backward to change a focal distance of the objective;

a shutter blade driving circuit having a shutter blade driving motor used to open and close shutter blades for every exposure;

a built-in strobe;

a common power source coupled to said circuits and having an output power;

a photographing mode selector selecting one of an automatic strobe discharge mode, a preflash mode, a forcible strobe discharge mode and a forcible strobe disable mode;

a fixed reference signal;

a monitor circuit coupled to said fixed reference signal and to said common power source, said monitor comparing said output power of said power source to said reference signal, and disabling said shutter release motor if said power output is less than said reference signal; and a control circuit coupled to said mode selector, said film transporting circuit, said lens barrel driving circuit, said shutter blade driving circuit, and said strobe driving circuit for selectively controlling energization of said circuits during said comparing, wherein particular one or ones of said circuits are energized depending upon the photographing mode selected by said mode selector, whereby the power drawn from said power source is varied during testing according to the photographing mode selected, such that the power source must output more power in some of said photographing modes than in other ones of said photographing modes for said power source to exceed said fixed reference signal level and said shutter is released for photographing.

16. The photographic camera as defined in claim 15, wherein said determination is performed with the lens barrel driving circuit energized and the shutter blade driving circuit disabled in the low luminance automatic strobe discharge mode.

17. The photographic camera as defined in claim 15, wherein said determination is performed with the lens barrel driving circuit energized and the shutter blade driving circuit disabled in the forcible strobe discharge mode.

18. The photographic camera as defined in claim 15 wherein said determination is performed with the shutter blade driving circuit energized in the forcible strobe disable mode.

* * * * *

UNITED STATES PATENT AND TRADEMARK OFFICE
CERTIFICATE OF CORRECTION

PATENT NO.   : 5,500,710
DATED        : March 19, 1996
INVENTOR(S)  : Tatsuo Saito et al.

It is certified that error appears in the above-indentified patent and that said Letters Patent is hereby corrected as shown below:

Column 7, claim 5, line 43;
    Delete "source voltage monitor for a".

Signed and Sealed this

Eighth Day of October, 1996

Attest:

BRUCE LEHMAN

*Attesting Officer*      *Commissioner of Patents and Trademarks*